United States Patent
Tsuchiya (10) Patent No.: US 8,903,276 B2
(45) Date of Patent: Dec. 2, 2014

(54) ARM UNIT WITH REDUCED SPRING LOAD

(71) Applicant: KYOCERA Document Solutions Inc., Osaka (JP)

(72) Inventor: Hiroaki Tsuchiya, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/259,952

(22) Filed: Apr. 23, 2014

(65) Prior Publication Data

US 2014/0318291 A1  Oct. 30, 2014

(30) Foreign Application Priority Data

Apr. 26, 2013 (JP) ................. 2013-094662

(51) Int. Cl.
*G03G 15/00* (2006.01)
*F16H 21/44* (2006.01)

(52) U.S. Cl.
CPC ..................... *F16H 21/44* (2013.01)
USPC ........................................................ 399/125

(58) Field of Classification Search
CPC ....................................................... F16H 21/44
USPC ......................................................... 399/125
See application file for complete search history.

(56) References Cited

U.S. PATENT DOCUMENTS

| 4,134,516 | A | * | 1/1979 | Sullo | 220/242 |
|---|---|---|---|---|---|
| 4,589,758 | A | * | 5/1986 | Kasama et al. | 399/122 |
| 4,789,876 | A | * | 12/1988 | Miyai et al. | 399/108 |
| 2008/0175620 | A1 | * | 7/2008 | Ohta et al. | 399/125 |
| 2011/0242626 | A1 | | 10/2011 | Nagashima | 358/498 |
| 2011/0299884 | A1 | | 12/2011 | Uchida | 399/110 |
| 2014/0130302 | A1 | * | 5/2014 | Bettinzoli | 16/304 |

FOREIGN PATENT DOCUMENTS

JP    2008-209626 A    9/2008

* cited by examiner

*Primary Examiner* — Rodney Fuller
(74) *Attorney, Agent, or Firm* — Stein IP, LLC (57) ABSTRACT

An arm unit includes a first member, a rotation shaft, a second member, a spring member, and a displacement adjusting device. The second member is expandably connected to the first member via the rotation shaft. The spring member is configured to bias the first member and the second member to a direction of expanding the first member and the second member. The displacement adjusting device is configured to displace the spring member at an amount of displacement less than an amount of displacement between the first member and the second member around the rotation shaft.

6 Claims, 11 Drawing Sheets

| | ARM ANGLE | DEGREE | 130 | 0 |
|---|---|---|---|---|
| SPRING SPECIFICATIONS | FREE ANGLE | DEGREE | 180 | 180 |
| SPRING SPECIFICATIONS | TORSION ANGLE | DEGREE | 69 | 139 |
| SPRING SPECIFICATIONS | DESIGN ANGLE | DEGREE | 111 | 41 |
| SPRING SPECIFICATIONS | MOMENT | N·mm | 62.7 | 124.4 |
| SPRING SPECIFICATIONS | ARM LENGTH A | mm | 32 | 32 |
| SPRING SPECIFICATIONS | ARM LENGTH B | mm | 23 | 32 |
| SPRING SPECIFICATIONS | LOAD X | N | 2.73 | 3.89 |
| DISTANCE C | | mm | 22 | 25.5 |
| GEAR β | MOMENT | N·mm | 60.1 | 99.2 |
| GEAR α | MOMENT | N·mm | 40.1 | 66.1 |
| SPRING MOMENT - GEAR MOMENT | | N·mm | 22.6 | 58.3 |

FIG. 13

|  | ARM ANGLE | DEGREE | 130 | 0 |
|---|---|---|---|---|
| SPRING SPECIFICATIONS | FREE ANGLE | DEGREE | 179 | 179 |
| SPRING SPECIFICATIONS | TORSION ANGLE | DEGREE | 31 | 161 |
| SPRING SPECIFICATIONS | DESIGN ANGLE | DEGREE | 148 | 18 |
| SPRING SPECIFICATIONS | MOMENT | N·mm | 22.7 | 117.8 |

ARM UNIT WITH REDUCED SPRING LOAD

CROSS-REFERENCE TO RELATED APPLICATIONS

This application is based upon, and claims the benefit of priority from, corresponding Japanese Patent Application No. 2013-094662, filed in the Japan Patent Office on Apr. 26, 2013, the entire contents of which are incorporated herein by reference.

BACKGROUND OF THE INVENTION

Unless otherwise indicated herein, the description in this section is not prior art to the claims in this application and is not admitted to be prior art by inclusion in this section.

Some image forming apparatuses such as a copier and a multi-functional peripheral (MFP), which form images on paper sheets by electrophotographic system, include a scanner unit (a document reading device) at the top of an apparatus main body. The scanner unit illuminates a document from a back side of an exposure glass and optically reads the document using a Charge Coupled Device (CCD) sensor or a similar sensor.

Some image forming apparatuses include a scanner unit. The scanner unit is openably/closably located at an apparatus main body for exchanging a drum unit, a toner cartridge, or a similar component inside the apparatus main body. Lifting the scanner unit opens an opening of the apparatus main body obstructed by the scanner unit. An operator can access the inside of the apparatus main body via the opening, thus the operator can exchange a predetermined component or perform similar work.

SUMMARY OF THE INVENTION

An arm unit according to the disclosure includes a first member, a rotation shaft, a second member, a spring member, and a displacement adjusting device. The second member is expandably connected to the first member via the rotation shaft. The spring member is configured to bias the first member and the second member to a direction of expanding the first member and the second member. The displacement adjusting device is configured to displace the spring member at an amount of displacement less than an amount of displacement between the first member and the second member around the rotation shaft.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of one embodiment of the disclosure with reference to the drawings. The following describes a multi-functional peripheral with a document reading function as an example as an image forming apparatus with an arm unit according to the disclosure.

Figure 1:
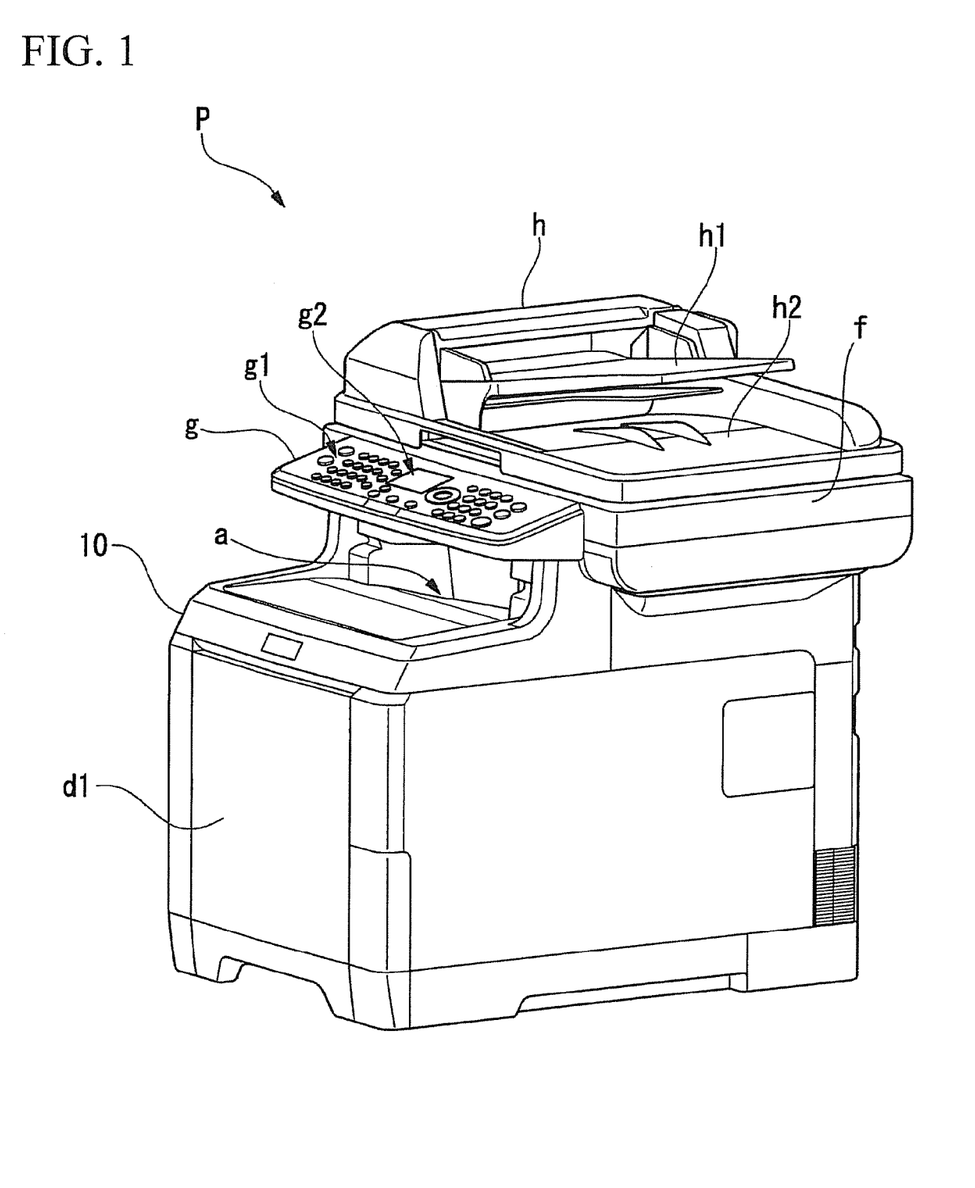
FIG. 1 is a perspective view illustrating an external appearance of a multi-functional peripheral of an embodiment of the disclosure.
Figure 2:
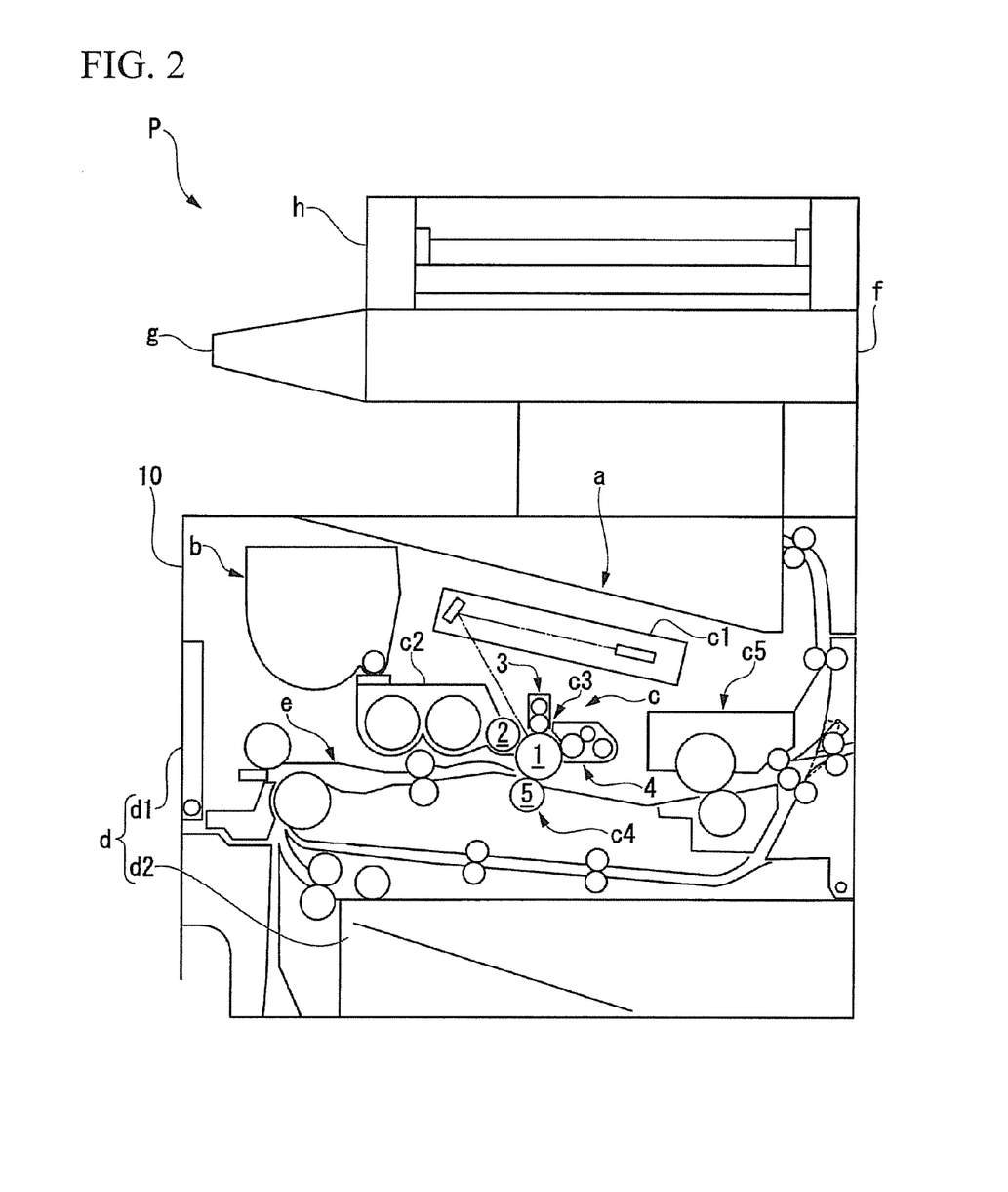
FIG. 2 is a schematic diagram illustrating an internal constitution of the multi-functional peripheral of the embodiment of the disclosure.

FIG. 1 is a perspective view illustrating an external appearance of a multi-functional peripheral P of an embodiment of the disclosure. FIG. 2 is a schematic diagram illustrating an internal constitution of the multi-functional peripheral P of the embodiment of the disclosure. As illustrated in FIG. 2, the multi-functional peripheral (an image forming apparatus) P includes a discharge unit a, a toner housing unit b, an image forming unit c, and a paper sheet unit d. The multi-functional peripheral P includes a conveying unit e. The conveying unit e extends from the paper sheet unit d, which is positioned at a lower portion, to the discharge unit a, which is positioned at an upper portion. The multi-functional peripheral P includes a scanner unit (a document reading device) f, an operation unit g, and a document feeding unit h above the discharge unit a.

The discharge unit a discharges a paper sheet (a sheet material) on which a predetermined image is formed via the conveying unit e. An inclination is imparted to the bottom surface of the discharge unit a, devising the bottom surface in such a way that when there are a plurality of discharged paper sheets, they can be stacked aligned along one end. The toner housing unit b is, for example, formed of a toner container for black toner (BK). The toner housing unit b can supply a developing unit c2 of the image forming unit c with toner.

The image forming unit c includes a laser scanning unit c1, the developing unit c2, a drum unit c3, a transferring unit c4, and a fixing unit c5. The laser scanning unit c1, similarly to well-known laser scanning units, includes a light beam generator, a polygon mirror, an fθ lens, and a similar component. The light beam generator generates a laser beam. The polygon mirror scans a light beam irradiated from the light beam generator. The fθ lens forms an image on a photoreceptor drum 1, which will be described below, with the light beam scanned by the polygon mirror.

The developing unit c2 supplies the photoreceptor drum 1 with toner to develop an electrostatic latent image formed at a circumference surface of the photoreceptor drum 1. The developing unit c2 includes a developing roller 2. The developing roller 2 is radially opposed to the circumference surface of the photoreceptor drum 1. The drum unit c3 includes the photoreceptor drum 1. The laser scanning unit c1 generates an electrostatic latent image on the drum circumference surface of the photoreceptor drum 1. A toner image is formed at the photoreceptor drum 1 with toner supplied from the toner housing unit b to the developing unit c2.

At the peripheral area of the photoreceptor drum 1, a charger 3, a cleaner 4, or a similar component are mutually opposed. The charger 3 charges the circumference surface of the photoreceptor drum 1. The cleaner 4 removes toner remaining on the circumference surface after the transfer. The charger 3, the cleaner 4, and a similar component of this embodiment are attachably/removably made unitary together with the photoreceptor drum 1 as the drum unit c3. The transferring unit c4 includes a transfer roller 5. The transfer roller 5 is radially opposed to the circumference surface of the photoreceptor drum 1. The transfer roller 5 is located so as to press the photoreceptor drum 1.

Accordingly, in association with rotatable drive of the photoreceptor drum 1, the transfer roller 5 can rotate. When a predetermined sheet material, for example, a paper sheet is conveyed via the conveying unit e, the transfer roller 5 can be rotated with the paper sheet nipped between the transfer roller 5 and the photoreceptor drum 1, also ensuring the paper sheet to be conveyed to the fixing unit c5 side.

The fixing unit c5 is located at a part of the conveying unit e downstream side with respect to the transferring unit c4. The fixing unit c5 is constituted with a pair of rollers disposed so as to nip the paper sheet conveyed by the conveying unit e. The fixing unit c5 pressurizes and heats a toner image with the pair of rollers so as to fix the toner image on the paper sheet transferred by the transferring unit c4 on the paper sheet.

The paper sheet unit d includes a sheet feed tray d1 and a sheet feed cassette d2. The sheet feed tray d1 is openably/closably located to an apparatus main body 10. The sheet feed cassette d2 is located to be freely extractable to the apparatus main body 10. The paper sheets can be supplied from the sheet feed tray d1 or the sheet feed cassette d2 to the conveying unit e one by one.

The conveying unit e extends from the paper sheet unit d, which is positioned at the lower portion, to the discharge unit a, which is positioned at the upper portion. The conveying unit e is constituted by a plurality of conveyance rollers and a guide plate. This conveying unit e can convey the paper sheets supplied from the paper sheet unit d to the discharge unit a one by one.

A scanner unit f reads a set document and obtains an original image data of the image of the document. The scanner unit f includes a Charge Coupled Device (CCD) sensor (not illustrated) mounted to a carriage. The scanner unit f reads a document set on an exposure glass (not illustrated) or documents sequentially fed by a document feeding unit h.

An operation unit g outputs a signal corresponding to an operation (an operation signal) by a user. The operation unit g indicates various information such as information on a state of the multi-functional peripheral P. The operation unit g includes an operation key g1 and an operation display unit g2 (see FIG. 1). The operation key g1 is a hardware key such as a copy start key, a copy stop/clear key, a numeric keypad (value input keys), and a function switch key. The operation display unit g2 is a touch panel opposed to a display screen of a liquid crystal panel or an organic EL panel. The operation display unit g2 outputs a signal indicative of a coordinate at a site pressed by the user as an operation signal.

The document feeding unit h is a device that sequentially feeds documents to be read automatically. The document feeding unit h introduces a document housed in a sheet feed tray h1 to a conveyance path (not illustrated) via the scanner unit f with a pickup roller (not illustrated) and discharges the document to a sheet discharge tray h2. The scanner unit f includes a slit-shaped exposure glass (not illustrated) separately from the exposure glass where a document is to be set. A document automatically fed by the document feeding unit h is read via the slit-shaped exposure glass.

In the multi-functional peripheral P with the above-described constitution, the laser scanning unit c1 irradiates a laser beam corresponding to image data to the photoreceptor drum 1 to form an electrostatic latent image. Thus, the supplied toner develops a toner image. Then, the transferring unit c4 transfers the toner image carried on the photoreceptor drum 1 to the paper sheet, and the fixing unit c5 pressurizes and heats the toner image for fixation. Finally, the image-printed paper sheet is discharged to the discharge unit a.

Figure 3:
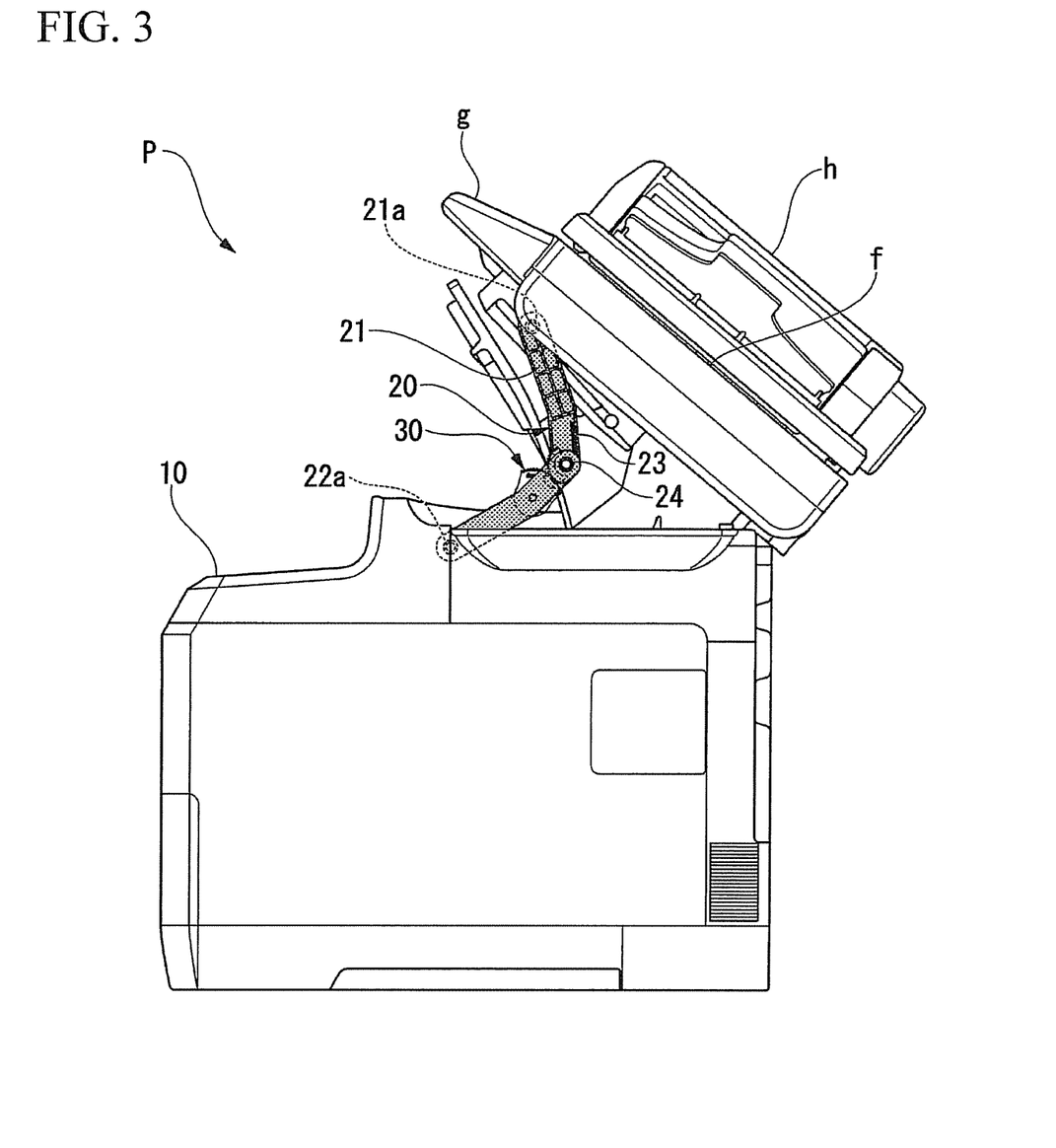
FIG. 3 is a side view illustrating an open state of a scanner unit of the multi-functional peripheral of the embodiment of the disclosure.

Next, the following describes a constitution of an arm unit 20 located at the multi-functional peripheral P with the above-described constitution in detail with reference to FIGS. 3 to 7. FIG. 3 is a side view illustrating an open state of the scanner unit f of the multi-functional peripheral P of the embodiment of the disclosure. FIGS. 4 to 7 illustrate a constitution and an operation of the arm unit 20 of the embodiment of the disclosure.

As illustrated in FIG. 3, the scanner unit f is openably/closably disposed to the apparatus main body 10. The scanner unit f of the embodiment is connected to the apparatus main body 10 via a hinge structure (not illustrated). The scanner unit f is openably/closably disposed with a back side of the apparatus main body 10 as fulcrum. The multi-functional peripheral P includes the arm unit 20 for holding the lifted scanner unit f. The arm unit 20 is located between the apparatus main body 10 and the scanner unit f. The arm unit 20 of this embodiment holds a forward end portion of the lifted scanner unit f at the front side of the apparatus main body 10.

Figure 4:
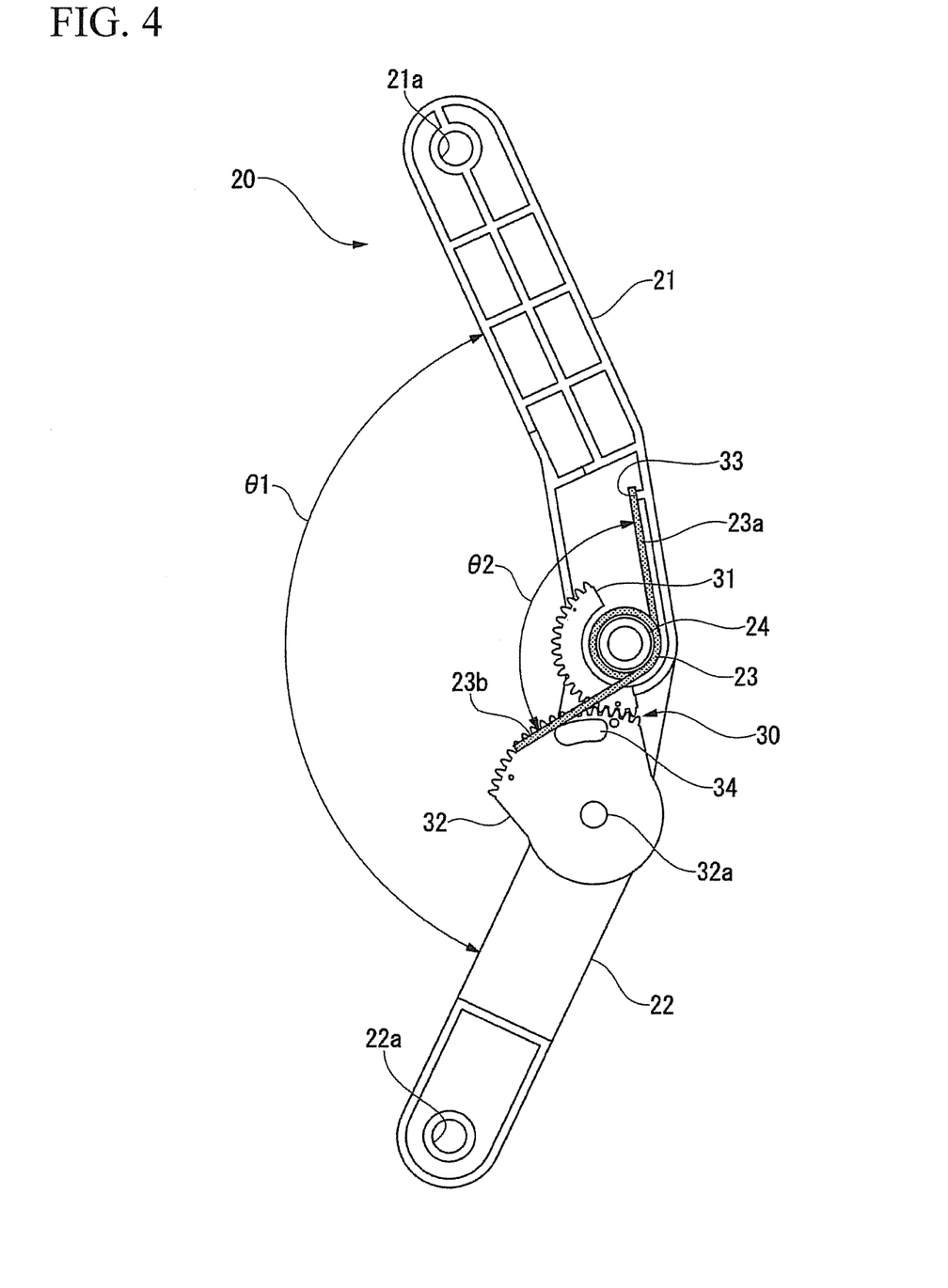
FIG. 4 illustrates a constitution and an operation of an arm unit of the embodiment of the disclosure.
Figure 5:
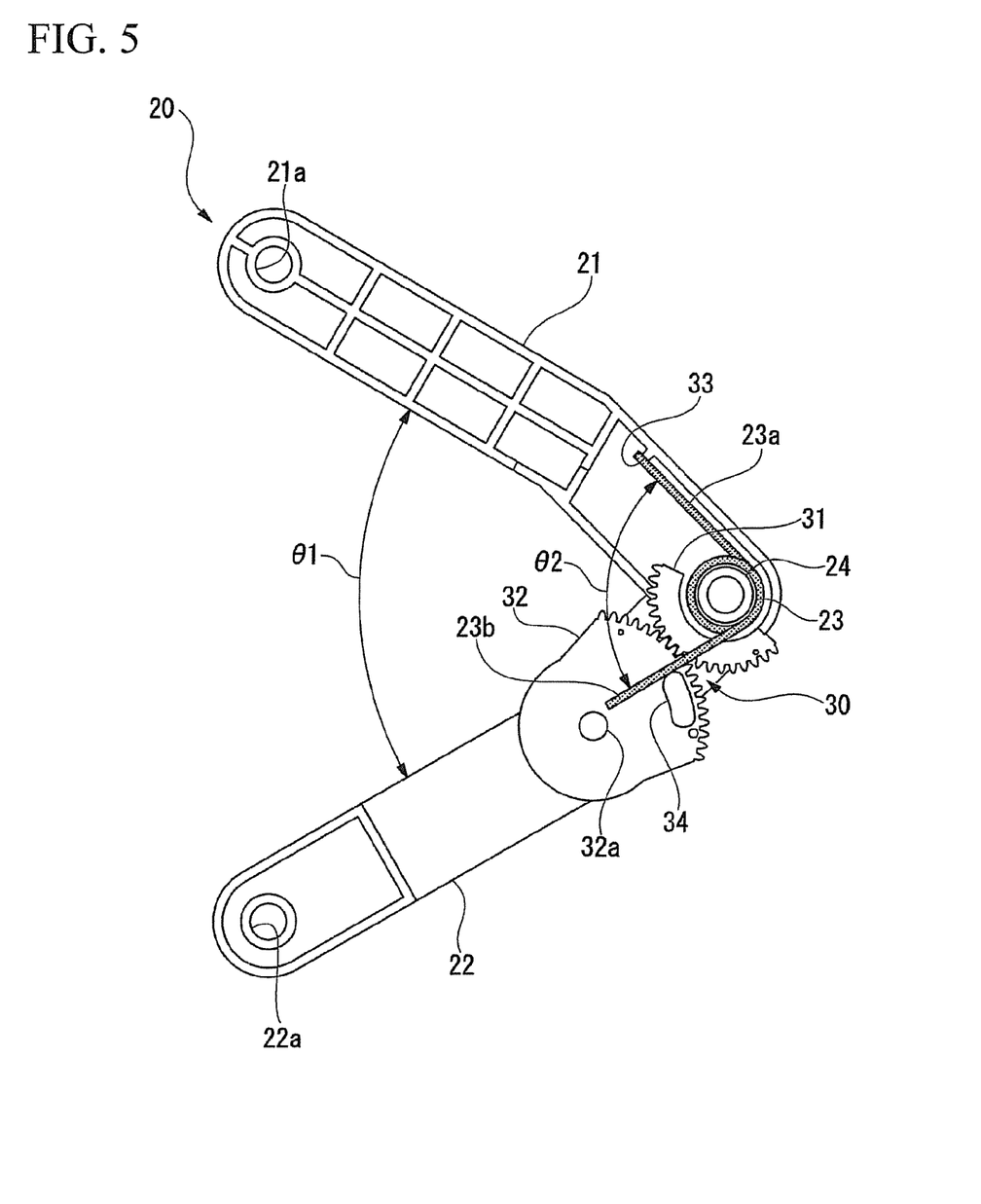
FIG. 5 illustrates a constitution and an operation of the arm unit of the embodiment of the disclosure.
Figure 6:
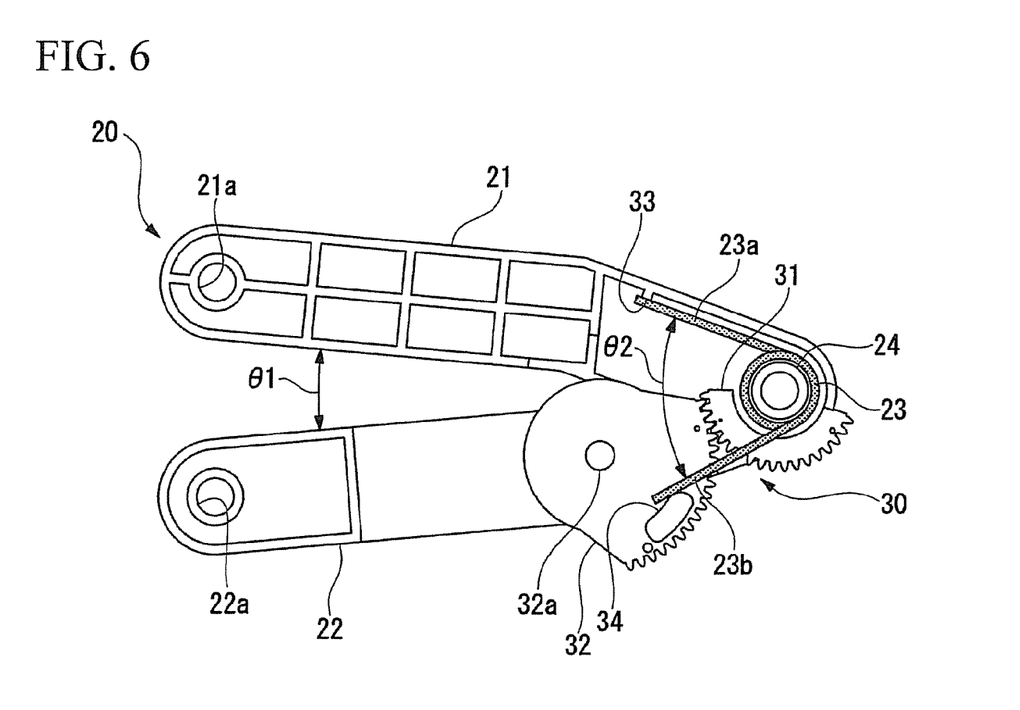
FIG. 6 illustrates a constitution and an operation of the arm unit of the embodiment of the disclosure.
Figure 7:
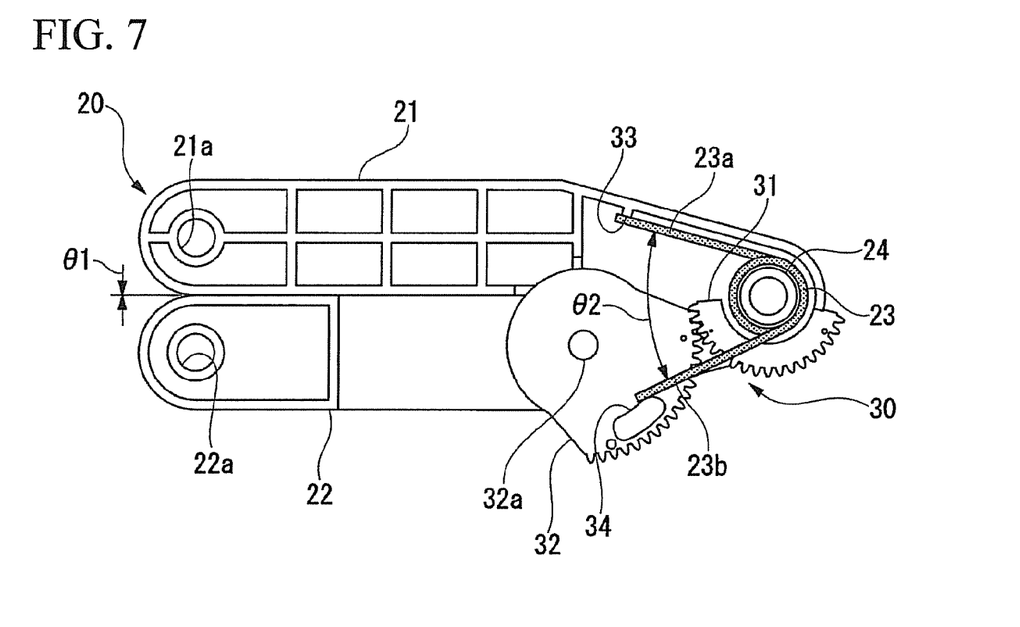
FIG. 7 illustrates a constitution and an operation of the arm unit of the embodiment of the disclosure.

As illustrated in FIGS. 4 to 7, the arm unit 20 includes a first member 21 and a second member 22. The first member 21 and the second member 22 are expandably coupled via a rotation shaft 24. Accordingly, with the scanner unit f closed (see FIG. 1), the arm unit 20 is folded as illustrated in FIG. 7. With the scanner unit f open (see FIG. 3), the arm unit 20 is in an expanded state as illustrated in FIG. 4. As illustrated in FIG. 4, this arm unit 20 includes the first member 21, the second member 22, a spring member 23, and a displacement adjusting device 30.

The first member 21 is an elongated member forming an upper arm portion of the arm unit 20. The first member 21 has a hole portion 21a at the distal end portion. As illustrated in FIG. 3, the hole portion 21a is connected to the scanner unit f. Thus, the distal end portion of the first member 21 is rotatably connected to the scanner unit f with the hole portion 21a. Meanwhile, as illustrated in FIG. 4, the first member 21 includes the rotation shaft 24 at the base end portion. The first member 21 is rotatably connected to the second member 22 with the rotation shaft 24.

The second member 22 is an elongated member forming a forearm portion of the arm unit 20. The second member 22 has a hole portion 22a at the distal end portion. As illustrated in FIG. 3, the hole portion 22a is connected to the apparatus main body 10. Thus, the distal end portion of the second member 22 is rotatably connected to the apparatus main body 10 with the hole portion 22a. Meanwhile, as illustrated in FIG. 4, the second member 22 includes the rotation shaft 24 at the base end portion. The second member 22 is rotatably connected to the first member 21 with the rotation shaft 24.

The spring member 23 biases the first member 21 and the second member 22 to a direction of expanding the first member 21 and the second member 22. The spring member 23 of this embodiment is a torsion spring. This spring member 23 biases the first member 21 at one arm 23a and biases the second member 22 at another arm 23b. The spring member 23 is mounted at the peripheral area of the rotation shaft 24. The spring member 23 causes bias (moment) in a direction so as to appropriately act on the first member 21 and the second member 22 to expand the first member 21 and the second member 22.

The displacement adjusting device 30 displaces the spring member 23 at an amount of displacement less than amount of displacement between the first member 21 and the second member 22 around the rotation shaft 24. As illustrated in FIGS. 4 to 7, the displacement adjusting device 30 of this embodiment reduces an amount of displacement of an opening degree θ2 formed by the one arm 23a and the other arm 23b of the spring member 23 with respect to an amount of displacement of an opening degree θ1 formed by the first member 21 and the second member 22. The displacement adjusting device 30 includes a first gear 31, a second gear 32, a first contact point portion 33, and a second contact point portion 34.

The first gear 31 is located at the first member 21. The first gear 31 is fixed to the first member 21 and constituted so as not to rotate relative to the first member 21. The first gear 31 is fixed to the first member 21 placing at the rotation shaft 24 as its center. Thus, when the first member 21 is rotated around the rotation shaft 24 as its center, the first gear 31 is rotated integrally with the first member 21 so as not to displace a positional relationship with respect to the first member 21.

The second gear 32 is located at the second member 22. The second gear 32 engages the first gear 31 and is freely rotatable relative to the second member 22. The second gear 32 rotates relative to the second member 22 around a rotation shaft 32a as its center. The rotation shaft 32a is separately located from the rotation shaft 24. Here, the first gear 31 is located at the rotation shaft 24 as its center. Accordingly, rotation of the second member 22 with the rotation shaft 24 as its center does not change a distance between the centers of the first gear 31 and the second gear 32, thus ensuring maintaining an engaged state.

When the second member 22 is rotated around the rotation shaft 24 as its center, the second gear 32 is rotated integrally with the second member 22. Further, the second gear 32 displaces a rotation angle with respect to the second member 22 (see FIGS. 4 to 7). For example, when the second member 22 clockwise rotates with respect to the first member 21 (FIG. 4 to FIG. 5 to FIG. 6 to FIG. 7), the second gear 32 clockwise rotates relative to the second member 22. When the second member 22 counterclockwise rotates with respect to the first member 21 (FIG. 7 to FIG. 6 to FIG. 5 to FIG. 4), the second gear 32 counterclockwise rotates relative to the second member 22.

The first member 21 includes the first contact point portion 33. The first contact point portion 33 contacts the one arm 23a of the spring member 23. The first contact point portion 33 of this embodiment is integrally formed to the first member 21. The first contact point portion 33 has a convex shape facing a side of direction to which the first member 21 is folded, a spring load is applied from the one arm 23a of the spring member 23 to the convex-shaped top.

The second gear 32 includes the second contact point portion 34. The second contact point portion 34 contacts the other arm 23b of the spring member 23. The second contact point portion 34 of this embodiment is integrally formed to the second gear 32. The second contact point portion 34 is located at a position apart from a rotational center position of the second gear 32. In detail, the second contact point portion 34 is positioned apart from the rotation shaft 32a of the second gear 32, and located at a disk portion (a plate part) of the second gear 32 projecting in a thickness direction.

The second contact point portion 34 has a pillar shape with a side surface formed at a predetermined curvature. The second contact point portion 34 receives a spring load from the other arm 23b of the spring member 23 at the pillar-shaped side portion. The second contact point portion 34 moves in the opposite direction to a moving direction of the second member 22. That is, the second contact point portion 34 is located at the position apart from the rotational center of the second gear 32. Accordingly, displacement of the rotation angle of the second gear 32 with respect to the second member 22 moves the second contact point portion 34 relative to the second member 22.

In detail, as illustrated in FIG. 4, when the first member 21 and the second member 22 open to the outside (expanded), the second contact point portion 34 moves toward the inside. As illustrated in FIG. 7, when the first member 21 and the second member 22 close to the inside (folded), the second contact point portion 34 moves toward the outside. As shown in FIG. 7, when the first member 21 and the second member 22 are folded, the second contact point portion 34 of this embodiment projects outside with respect to the second member 22.

Subsequently, the following describes an action of the arm unit 20 in the multi-functional peripheral P with the above-described constitution.

As illustrated in FIG. 3, lifting the scanner unit f, which is openably/closably disposed to the apparatus main body 10, the folded arm unit 20 expands. The arm unit 20 has the hole portion 21a and the hole portion 22a. The hole portion 21a and the hole portion 22a are rotatably connected to the scanner unit f and the apparatus main body 10, respectively. The arm unit 20 holds the scanner unit f lifted by expanding the first member 21 and the second member 22, which are connected via the rotation shaft 24, at an open side of the scanner unit f.

As illustrated in FIG. 4, the first member 21 and the second member 22 are automatically expanded by the bias from the spring member 23. At this time, the second member 22 counterclockwise rotates relative to the first member 21 (FIG. 7 to FIG. 6 to FIG. 5 to FIG. 4). Synchronizing with counterclockwise rotation of the second member 22, the second gear 32 engaged with the first gear 31 counterclockwise rotates relative to the second member 22. The second gear 32 includes the second contact point portion 34 in contact with the other arm 23b of the spring member 23. In association with rotation of the second gear 32, the second contact point portion 34 moves in the opposite direction to the moving direction of the second member 22.

Thus, when the second member 22 moves to an open direction with respect to the first member 21, the second contact point portion 34 moves to a close direction with respect to the second member 22. Accordingly, the amount of displacement of the spring member 23 can be reduced. The moving direction of the second member 22 is a direction of releasing accumulated power of the spring member 23. Meanwhile, the moving direction of the second contact point portion 34 is a direction for increasing accumulated power of the spring member 23. Accordingly, when the first member 21 and the second member 22 are expanded, the amount of displacement of the spring member 23 becomes less than the amount of displacement between the first member 21 and the second member 22. Accordingly, accumulated power of the spring member 23 to be released can be reduced.

Specifically, when the first member 21 and the second member 22 are displaced from the folded state illustrated in FIG. 7 to the expanded state illustrated in FIG. 4, the opening degree θ1 formed by the first member 21 and the second member 22 is displaced from 0° to 130°. On the other hand, the opening degree θ2 formed by the one arm 23a and the other arm 23b of the spring member 23 is displaced from 41° to 111°. That is, the amount (70°) of displacement of the spring member 23 is smaller than the amount (130°) of displacement between the first member 21 and the second member 22 by 60°. That is, the spring load of the spring member 23 for holding the scanner unit f can be set at the opening degree of 111°. Thus, the spring load with the first member 21 and the second member 22 expanded can be easily ensured.

Meanwhile, as illustrated in FIG. 1, closing the scanner unit f, which is openably/closably disposed to the apparatus main body 10, folds the arm unit 20 from an expanded state. As illustrated in FIG. 7, the first member 21 and the second member 22 are folded against the bias from the spring member 23. At this time, the second member 22 clockwise rotates relative to the first member 21 (FIG. 4 to FIG. 5 to FIG. 6 to FIG. 7) around the rotation shaft 24 as its center. Synchronizing with clockwise rotation of the second member 22, the second gear 32 engaged with the first gear 31 clockwise rotates relative to the second member 22. The second gear 32 includes the second contact point portion 34 in contact with the other arm 23b of the spring member 23. In association with rotation of the second gear 32, the second contact point portion 34 moves in the opposite direction to the moving direction of the second member 22.

Thus, when the second member 22 moves to a close direction with respect to the first member 21, the second contact point portion 34 moves to an open direction with respect to the second member 22. Accordingly, the amount of displacement of the spring member 23 can be reduced. The moving direction of the second member 22 is a direction for storing accumulated power of the spring member 23. Meanwhile, the moving direction of the second contact point portion 34 is a direction of releasing accumulated power of the spring member 23. Accordingly, when the first member 21 and the second member 22 are folded, the amount of displacement of the spring member 23 becomes less than the amount of displacement between the first member 21 and the second member 22. Accordingly, accumulated power of the spring member 23 to be increased can be reduced.

Specifically, when the first member 21 and the second member 22 are displaced from the expanded state illustrated in FIG. 4 to the folded state illustrated in FIG. 7, the opening degree θ1 formed by the first member 21 and the second member 22 is displaced from 130° to 0°. On the other hand, the opening degree θ2 formed by the one arm 23a and the other arm 23b of the spring member 23 is displaced from 111° to 41°. That is, the amount (70°) of displacement of the spring member 23 is smaller than the amount (130°) of displacement between the first member 21 and the second member 22 by 60°. That is, the spring load of the spring member 23 applied to the closed scanner unit f via the arm unit 20 is an opening degree of 41°. Compared with the case where the amount of displacement between the first member 21 and the second member 22 is the same, the spring load when the first member 21 and the second member 22 are folded can be reduced small.

As illustrated in FIG. 7, in this embodiment, when the first member 21 and the second member 22 are folded, the second contact point portion 34 projects to the outside with respect to the second member 22. Accordingly, compared with a conventional type where a fixed contact is provided to the second member 22, a spring load in a folded state can be reduced small. Accordingly, even if a load is kept being applied to the scanner unit f via the arm unit 20 constantly, a housing frame of the scanner unit f is not deformed. In the expanded state, since the opening degree θ2 is smaller than the conventional one, the spring member 23 weaker than the conventional spring member can be used. Accordingly, a plurality of springs need not to be installed due to of limit of stress, achieving reduction in the number of components, improvement in assembly of devices, and low cost.

Thus, according to the above-described embodiment, the disclosure is an arm unit 20 where the first member 21 and the second member 22 are expandably connected via the rotation shaft 24. The arm unit 20 includes the spring member 23 and a displacement adjusting device 30. The spring member 23 is configured to bias the first member 21 and the second member 22 to a direction of expanding the first member 21 and the second member 22. The displacement adjusting device 30 is configured to displace the spring member 23 at an amount of displacement less than an amount of displacement between the first member 21 and the second member 22 around the rotation shaft 24. With the constitution, the arm unit 20 and the multi-functional peripheral P that ensure appropriately holding the scanner unit f in an expanded state and reducing the accumulated power of the spring member 23 small with the arm unit 20 folded can be obtained.

Most recent scanner units are constituted by a resin frame. This extra force keeps applying in a closed state constantly, which may result in deformation. To prevent this deformation, a reinforcing member may be required. When the expanded scanner unit is displaced to a folded state, the spring member itself may exceed its stress limit depending on the amount of displacement. To avoid this, a plurality of spring members may need to be disposed. However, the embodiment can solve this problem without disposing a plurality of spring members.

Working Example

The following working example more clarifies effects of the disclosure. The disclosure is not limited to the following working examples; any modifications are possible without changing the gist within the scope of the disclosure.

Figure 8:
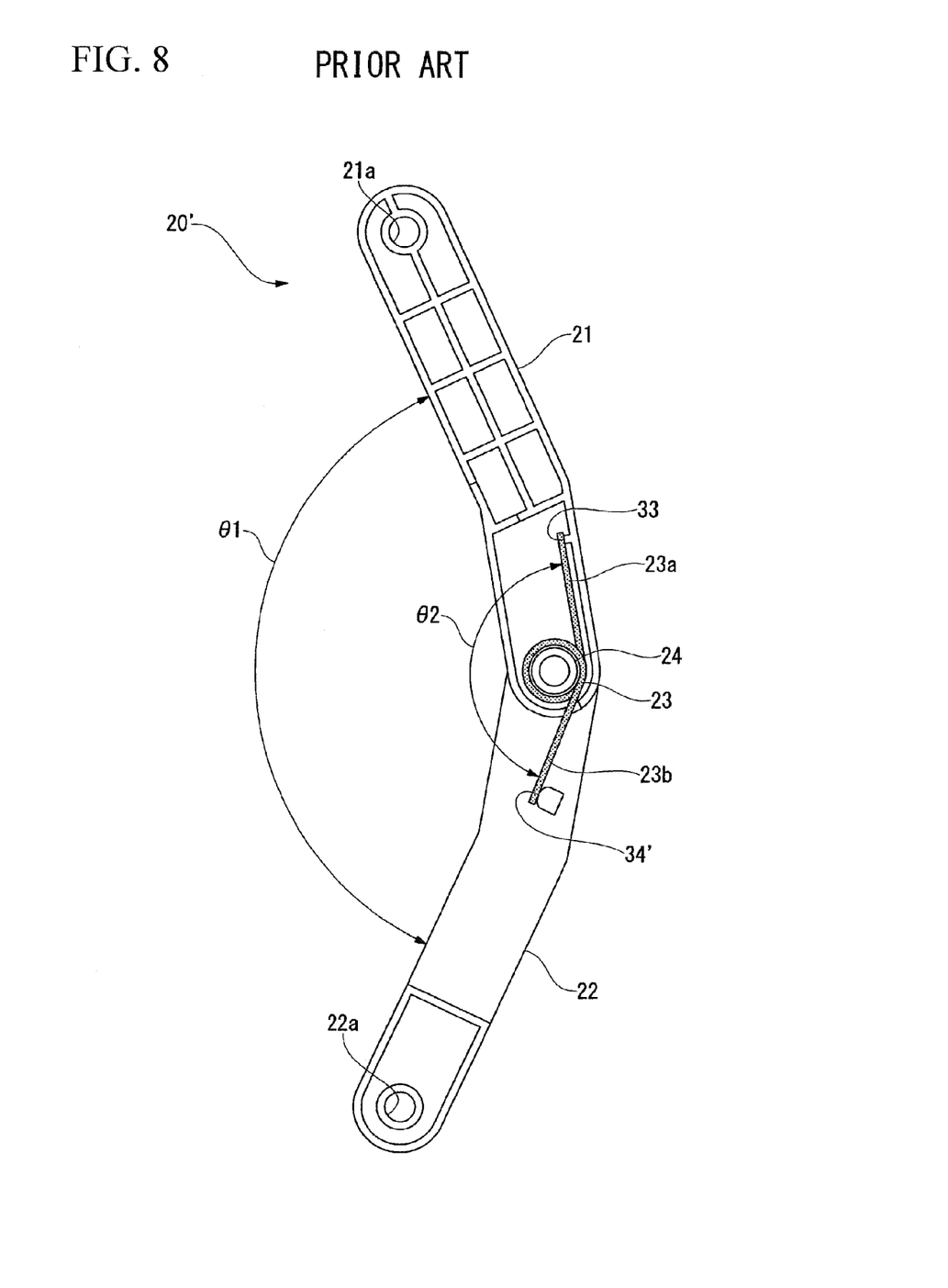
FIG. 8 illustrates a constitution and an operation of an arm unit as a comparative example.
Figure 9:
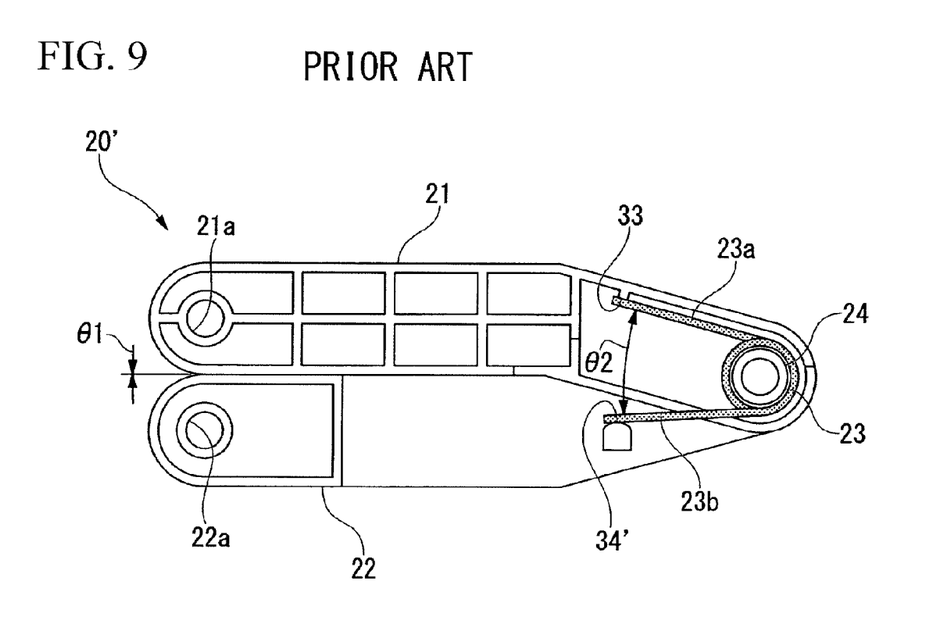
FIG. 9 illustrates a constitution and an operation of the arm unit as a comparative example.

FIGS. 8 and 9 illustrate a constitution and an operation of a conventional arm unit 20' as a comparative example. In the explanation below, constituent parts that are identical or equivalent to those in the embodiment discussed above are assigned identical symbols, and the explanations thereof are therefore abbreviated or omitted. The arm unit 20' includes the first member 21 and the second member 22. The first member 21 and the second member 22 are expandably connected via the rotation shaft 24. The arm unit 20' does not include the displacement adjusting device 30 but includes a second contact point portion 34' at the second member 22.

The amount of displacement between the first member 21 and the second member 22 around the rotation shaft 24 is the same as the above-described embodiment. The opening degree θ1 illustrated in FIG. 8 is displaced from 130° to the opening degree θ1 of 0° illustrated in FIG. 9. Since the spring member 23 does not include the displacement adjusting device 30, the amount of displacement of the spring member 23 is the same as the amount of displacement between the first member 21 and the second member 22. The opening degree θ2 illustrated in FIG. 8 is displaced from 161° to the opening degree θ2 of 31° illustrated in FIG. 9.

Figure 10:
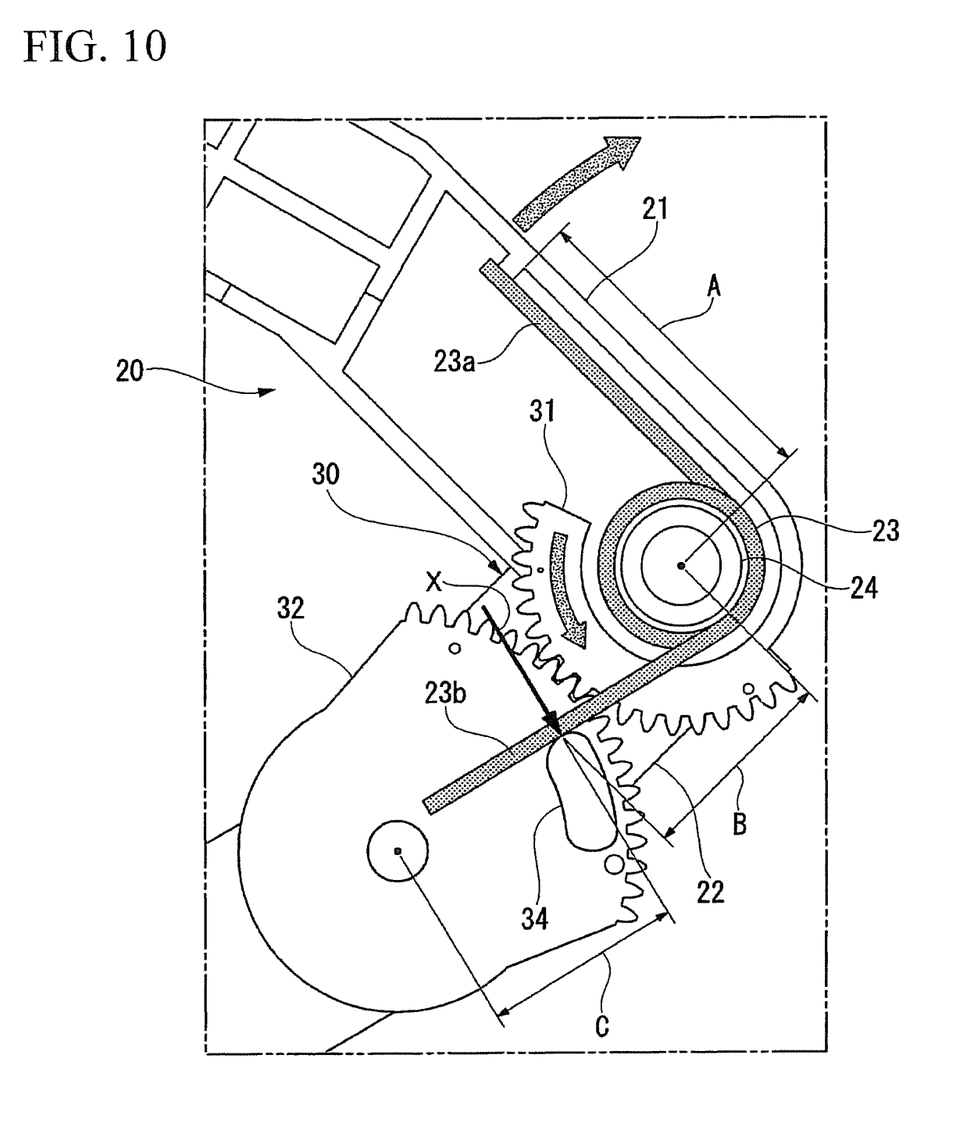
FIG. 10 is a drawing for describing analysis conditions of the arm unit.
Figure 11:
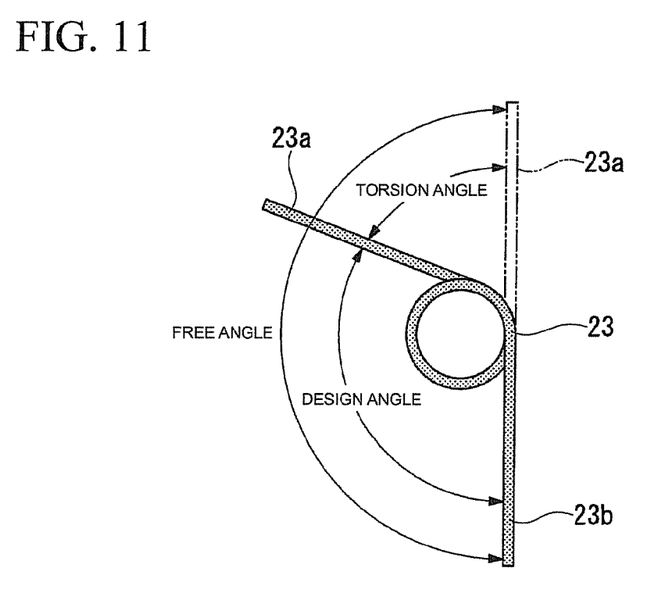
FIG. 11 is a drawing for describing the analysis conditions of the arm unit.
Figure 12:
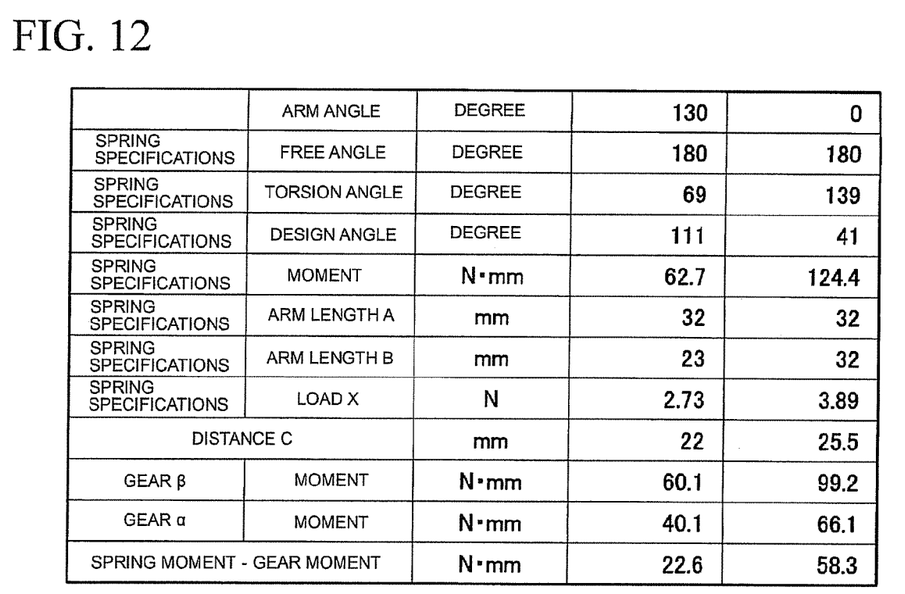
FIG. 12 is a table listing analysis results of the arm unit of a working example.
Figure 13:
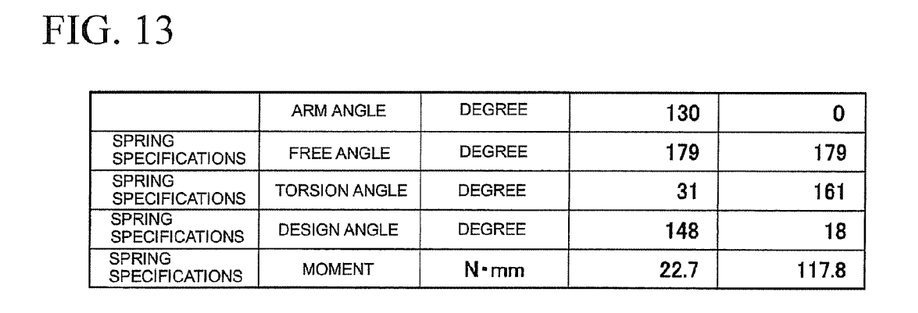
FIG. 13 is a table listing analysis results of the arm unit of the comparative example.

FIGS. 10 and 11 are drawings for describing analysis conditions of the arm unit 20. FIG. 12 is a table listing analysis results of the arm unit 20 of a working example. FIG. 13 is a table listing analysis results of the arm unit 20' of the comparative example. As listed in FIGS. 12 and 13, spring moment-gear moment (since a gear is absent, simply a moment in the conventional model) applied when the opening degree θ1 of the first member 21 and the second member 22 (an arm angle) was 130° (expanded) and 0° (folded) were analyzed.

FIG. 11 illustrates a free angle, a torsion angle, and a design angle as spring specifications of the spring member 23. The design angle means an angle of setting the spring load of the spring member 23 when an object is supported with the first member 21 and the second member 22 expanded. A gear β illustrated in FIG. 12 is a tentative name of the second gear 32 (the number of teeth: 60) set for analysis, while a gear α illustrated in FIG. 12 is a tentative name of the first gear 31 (the number of teeth: 40) set for analysis.

FIG. 10 illustrates an arm length A, an arm length B, a load X as spring specifications of the spring member 23. FIG. 10 also illustrates a distance C for calculating a moment. The arm length A is a distance from the rotation shaft 24 center to a contact point of the first contact point portion 33. The arm length B is a distance from the rotation shaft 24 center to a contact point of the second contact point portion 34. The load X is a load applied to the contact point of the second contact point portion 34. The distance C is a distance from the rotation shaft 24 center of the second gear 32 to the contact point of the second contact point portion 34. Other spring specifications of the spring member 23 is: a spring line diameter of φ1.0, a material of SWC, a mean diameter of coil of φ14, and the number of active coils of 4.0.

As listed in the lowest column of FIG. 12, with the arm unit 20 of working example, the spring moment-gear moment of 22.6 N·mm was applied at the arm angle of 130° and the spring moment-gear moment of 58.3 N·mm was applied at the arm angle of 0°. Then, an amount of variation of the spring moment-gear moment when the arm angle was changed from 130° to 0° became 35.7 N·mm. That is, when the arm angle was changed from 130° to 0°, the spring load became approximately 2.58 times.

Meanwhile, as listed in the lowest column in FIG. 13, according to the arm unit 20' of the comparative example, the moment of 22.7 N·mm was applied at the arm angle of 130° and the moment of 117.8 N·mm was applied at the arm angle of 0°. Then, an amount of variation of the spring moment-gear moment when the arm angle was changed from 130° to 0° became 95.1 N·mm. That is, when the arm angle was changed from 130° to 0°, the spring load became approximately 5.2 times.

With the analysis conditions as described above, with the arm unit 20 of the working example, the spring load can be reduced by a change equal to or more than half of the change in the arm unit 20' of the comparative example. Accordingly, according to the arm unit 20 of the disclosure, disposing the displacement adjusting device 30 can achieve a spring constitution of less angle change than the open/close angle of the arm, thus the arm unit 20 of less load change than the conventional arm unit can be obtained.

The foregoing has described the preferred embodiments of the disclosure with reference to the drawings, the disclosure is not limited to the above embodiments. The shapes, combinations, or similar conditions of each constituent member shown in the embodiment described above is merely an example, and can be variously modified based on design requirements or the like within the scope that do not depart from the gist of the disclosure.

For example, the above-described embodiment describes a constitution of using a torsion spring as a spring member; however, the disclosure should not be limited to the constitution. The spring member may be, for example, a compression spring. The spring member may be a plate spring as well as a coil spring.

For example, the above-described embodiment describes a constitution where the displacement adjusting device causes a second contact point portion to move by rotation of the second gear in association with displacement between the first member and the second member; however, the disclosure should not be limited to the constitution. For example, a constitution where an angle sensor or a similar sensor may measure displacement between the first member and the second member, and based on the measurement result, a driving source such as a motor may move the second contact point portion.

For example, the above-described embodiment uses a multi-functional peripheral as an example of an image forming apparatus. However, the disclosure is applicable to an image forming apparatus such as a copier, a printer, and a facsimile device.

For example, the above-described embodiment describes an exemplary aspect of applying the arm unit to the image forming apparatus. However, the arm unit of the disclosure is applicable to apparatuses other than the image forming apparatus. For example, the use of the spring member automatically opens a bonnet, rear boot, or a similar component of a vehicle. The spring member is also applicable to general lids and doors held by the spring member.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An arm unit, comprising:
a first member;
a rotation shaft;
a second member expandably connected to the first member via the rotation shaft;
a spring member configured to bias the first member and the second member to a direction of expanding the first member and the second member; and a displacement adjusting device configured to displace the spring member at an amount of displacement less than an amount of displacement between the first member and the second member around the rotation shaft, wherein the displacement adjusting device comprises:
- a first gear secured to the first member placing the rotation shaft as a center;
- a second gear engaging the first gear, the second gear being freely rotatable relative to the second member;
- a first contact point portion located at the first member, the first contact point portion being in contact with one arm of the spring member; and
- a second contact point portion located at an apart position from a rotational center position of the second gear, the second contact point portion being in contact with another arm of the spring member.

2. The arm unit according to claim 1, wherein the second contact point portion moves in an opposite direction to a moving direction of the second member around the rotation shaft.

3. The arm unit according to claim 1, wherein the second contact point portion projects outside with respect to the second member when the first member and the second member are folded.

4. The arm unit according to claim 1,
wherein the spring member is a torsion spring.

5. An image forming apparatus, comprising:
the arm unit according to claim 1.

6. The image forming apparatus according to claim 5, further comprising:
an apparatus main body; and
a document reading device;
wherein the arm unit is located between the apparatus main body and the document reading device openably/closably disposed to the apparatus main body.

* * * * *